June 2, 1931.  E. N. HESCOCK  1,807,786
CABLE REEL
Filed Dec. 18, 1929  2 Sheets-Sheet 1
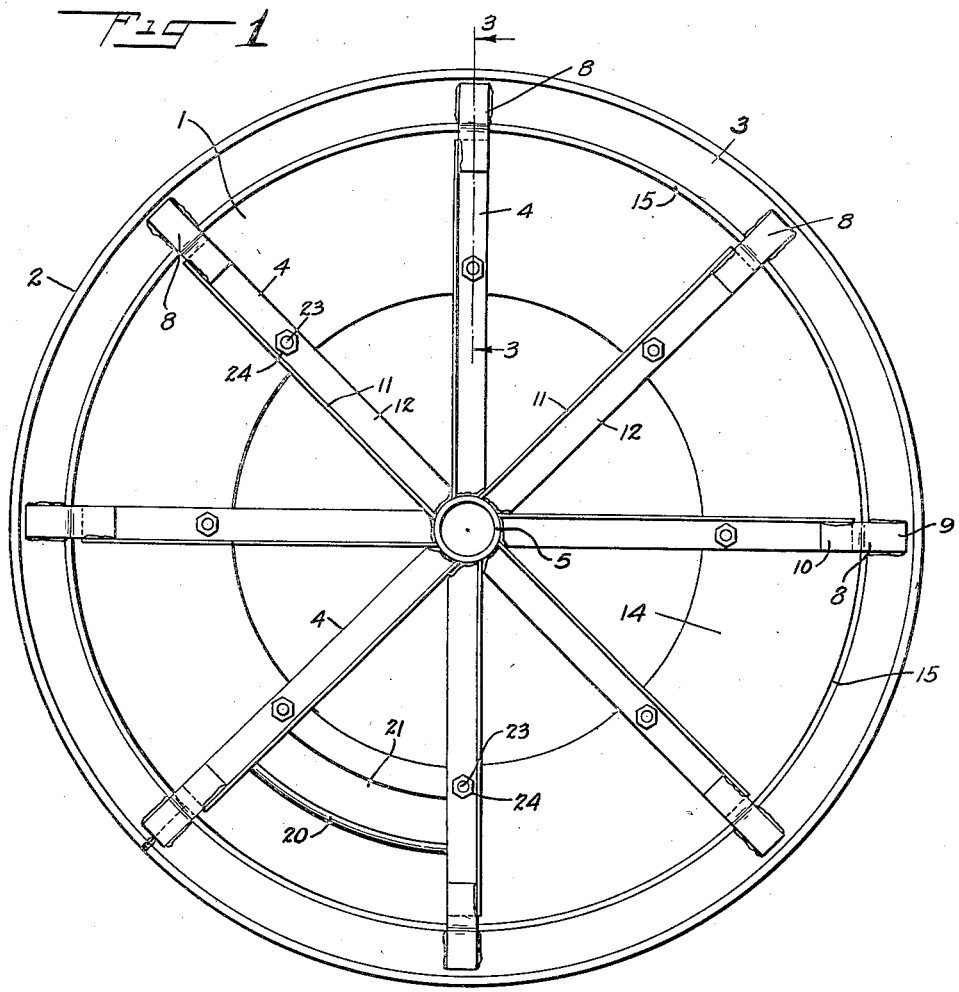
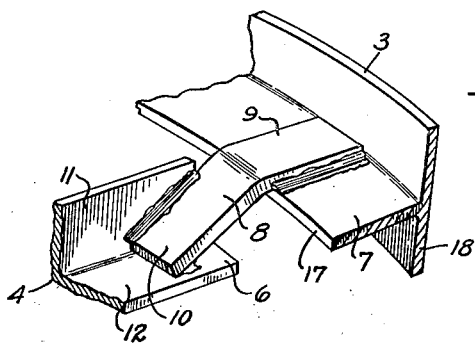
Ethan N. Hescock
INVENTOR
BY Alanby Johnson
ATTORNEY

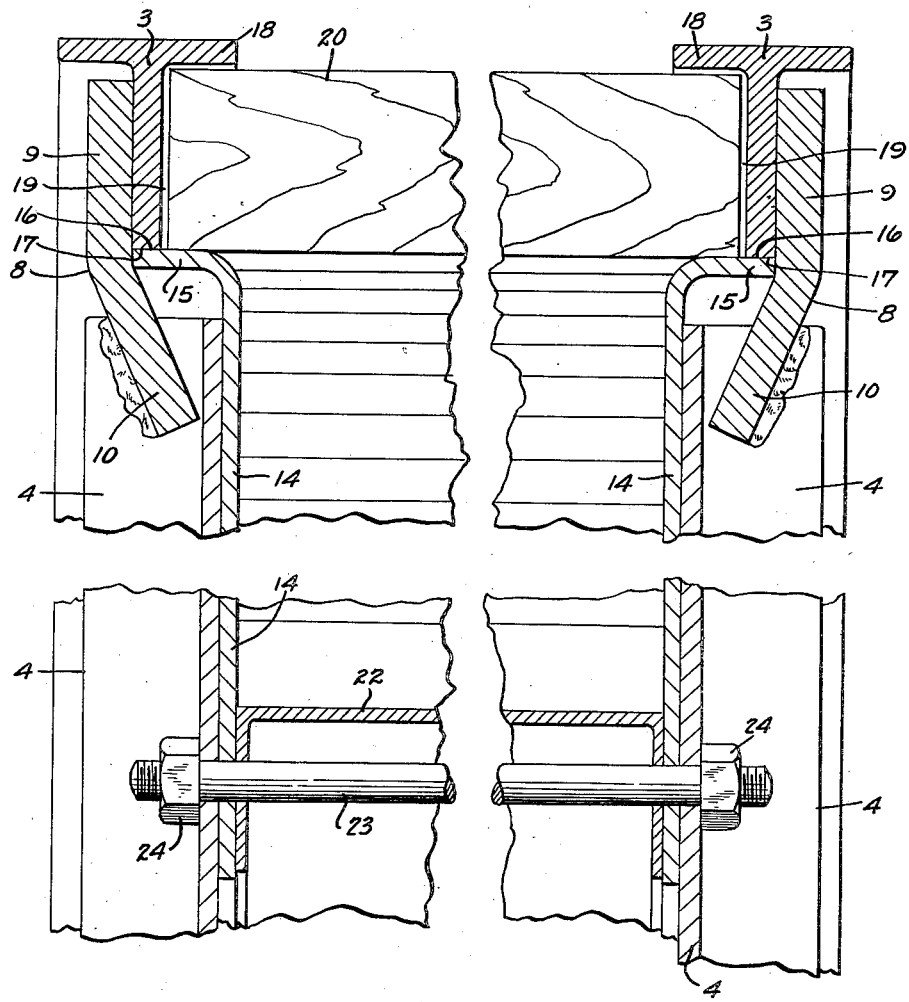
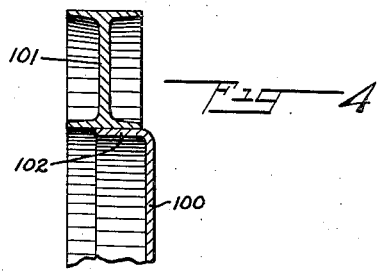

Patented June 2, 1931

1,807,786

UNITED STATES PATENT OFFICE

ETHAN N. HESCOCK, OF WESTFIELD, NEW JERSEY, ASSIGNOR TO HENRY B. NEWHALL CORPORATION, OF GARWOOD, NEW JERSEY, A CORPORATION OF NEW JERSEY

CABLE REEL

Application filed December 18, 1929. Serial No. 414,913.

My invention relates to strong metal cable reels for heavy cable, heavy wire, wire rope, or similar material.

My invention further relates to combinations, sub-combinations, articles of manufacture, and details of construction, which will be more fully hereinafter described in the specification and pointed out in the claims.

In the accompanying drawings showing an illustrative embodiment of my invention, and in which the same reference numerals refer to similar parts in the several figures:—

Figure 1 is a side elevation of my improved cable reel.

Figure 2 is an enlarged detail sectional view, showing the manner of securing the T rim to the angle iron spokes.

Figure 3 is a vertical section on line 3—3 of Figure 1, on an enlarged scale, looking in the direction of the arrows.

Figure 4 is a fragmentary sectional view of the old manner of attaching side or lining plates to the felloe.

Cable reels are used to hold heavy lead covered cable, heavy wire, wire rope, or other heavy material which can be wound upon the drum reels at the place of manufacture, and then the loaded cable reel is transported, in any suitable manner, to the location where the cable, wire, wire rope, or other material is to be used. To wind and unwind the cable, or other material from the reel, the reel is jacked up and temporarily supported so that it may rotate on a temporary axle passed through the hubs of the heads. For short distances, to get the cable reel into its proper position, it is sometimes customary to use the heads of the reel as wheels.

Necessarily, these cable reels have to be very strong to withstand the tremendous load and the rough handling to which they are subjected. At the same time the contents of the reel must be protected from abrasion, blows, or any distortion which, in a lead covered cable, might injure the insulation on the wires forming the cable and render the cable valueless.

Lagging and side or lining plates are employed to protect the cable wound on the drum. The application to the reel of these side or lining plates has heretofore, been a heavy item of expense.

My invention relates to such a cable reel in which the rim or felloe is formed of a T-rail, or similar structural piece of steel, or similar material, and attaching spokes, side or lining plates to form a strong rigid reel.

I form each head 1 of the reel 2 by bending a T-rail or similar structural piece of steel, in a bending machine, to form the rim or felloe 3. The angle iron spokes 4 are welded to the pipe hub 5 and to each other as shown in Figure 1, though it is to be understood, so far as the present invention is concerned, any suitable form of hub construction may be employed to which the spokes may be fastened in any suitable manner.

The other ends 6, 6 of the spokes 4, 4 are secured to the flange 7 of the T rim or felloe 3 in any suitable manner. I have shown a bent connecting member 8 having its end 9 welded to the flange 7 and its other end 10 welded both to the vertical flange 11 and the horizontal portion 12 of the angle iron spokes 4, 4. This makes a very firm, rigid skeleton head and one which lends itself to the ready attachment of the side or lining plates.

Previously I beams, such as 101, Figure 4, have been used for the folloes or rims. It is impossible to curve these I beams in the ordinary process of manufacture, without more or less variation in the curvature, forming a circular rim or felloe which is, for all practical purposes, a true circle, but which, as a matter of fact, will not be an exact circle.

To better describe my invention I have shown in Fig. 4 this old method of attaching a lining or side sheet 100 to the rim or felloe 101. These lining or side sheets are formed as segments and pre-formed in a press or otherwise to provide them with the arcuate flange 102. This flange has to be cut away, or axactly notched at intervals, for the spokes, whatever their contour may be. It is difficult and expensive to hold the lining or side sheets 100 in the same plane as the rim 101 when starting to weld the flange 102 to rim 101, and also to hold the flange 102 in proper position against the underside of the rim or felloe 101 while welding. A poor fit is the usual result, requiring chipping and grinding to make a neat job.

In my invention I avoid the necessity of notching the lining or side sheets 14, and chipping and grinding. I accurately fit them to the felloe or rim 3 regardless of any error in the circumference of the felloe.

These lining or side sheets are formed as segments of comparatively thin sheet metal, cut to the required size for the particular head, and provided with the flange 15. They are attached to the skeleton head by bending the flexible flanges 15, to compensate for any irregularity in the circumference of the T rim or felloe, and then welding them at 16 to the surface 17 of the flange 7. The side or lining plates 14 being out of line with the flange 7 of the rim or felloe, and the flange 15 being flexible it can be readily bent to meet the surface 17 of the T-rim. This makes a more or less flexible connection between the rim 3 and the side or lining plates 14. This does not, however, affect the rigidity of the head because the connecting members 8 rigidly hold the T-rim or felloe to the angle iron spokes 4.

The flange 15 of the side or lining plates 14, with the flange 18 of the T-rim form a groove 19 for the reception of the wood lining 20, which is a peripheral, removable protection to the contents of the reel 2.

One of the side or lining plates 14 is cut away and bent back to form a bead 20 and a slot 21 to permit one end (not shown) of the cable to be secured to one of the spokes 4, preparatory to winding it upon the drum 22. This drum is held to the two heads by means of through bolts 23, 23 and nuts 24, 24.

When I refer to a rim in my claims, I mean a rim which may, or may not, be used as a felloe. The structural shapes from which the rim is formed, may be made from any suitable material, as for example steel, or any material having the necessary strength.

Having thus described my invention in connection with an illustrative embodiment thereof, to the details of which I do not desire to be limited, what is claimed as new and what is desired to secure by Letters Patent is set forth in the appended claims.

What I claim is:

1. A new article of manufacture comprising a cable reel having heads formed of structural shapes of metal bent to form substantially circular rims, a hub, spokes, and side plates out of line with the rim and provided with means to compensate for any irregularity in the curvature of the rim, said means being secured to the rim.

2. A new article of manufacture comprising a cable reel having heads formed of structural shapes of metal bent to form substantially circular rims, a hub, spokes, and side plates out of line with the rim and provided with a bendable flange to compensate for any irregularity in the curvature of the rim, said bendable flange being secured to the rim.

3. A new article of manufacture comprising a cable reel having heads formed of T- shape pieces of metal bent to form substantially circular rims, a hub, spokes, and side plates out of line with the rim and provided with means to compensate for any irregularity in the circumference of the T-rim, said means being secured to the T-rim.

4. A new article of manufacture comprising a cable reel having heads formed of structural shapes of metal bent to form a substantially circular rim, a hub, and spokes connected to the hub and extending radially but not to the rim, and a connecting member secured to the end of the spokes and to the rim.

5. A new article of manufacture comprising a cable reel having heads formed of structural shapes of metal bent to form a substantially circular rim a hub, and spokes connected to the hub and extending radially towards but not to the rim and out of line with it, and a connecting member having one end secured to a spoke and another end to the rim.

6. A new article of manufacture comprising a cable reel having heads formed of structural shapes of metal bent to form a substantially circular rim, a hub, and angle iron spokes connected with the hub, said spokes having a horizontal and vertical portion extending radially towards but not to the rim, and connecting members securing the rim to the ends of the angle iron spokes.

7. A new article of manufacture comprising a cable reel having heads formed of structural shapes of metal bent to form a substantially circular rim, a hub, and angle iron spokes connected with the hub, said spokes having a horizontal and vertical portion extending radially towards but out of line with the rim, and connecting members securing the rim to the ends of the angle iron spokes.

8. A new article of manufacture comprising a cable reel having heads formed of T shapes of structural material bent to form a substantially circular rim, a hub, spokes connected with the hub and extending radially towards and out of line with the T-rim, means to secure the ends of the spokes to the rim, and side plates provided with means to compensate for any irregularity in the curvature of the T-rim.

9. A new article of manufacture comprising a cable reel having heads formed of T shapes of structural material bent to form a substantially circular rim, a hub, spokes connected with the hub and extending radially towards and out of line with the T-rim, means to secure the ends of the spokes to the rim, and side plates out of line with the T-rim and provided with a flexible flange to compensate for any irregularity in the curvature of the T-rim.

10. A new article of manufacture comprising a cable reel having heads formed of T shapes of structural material bent to form a substantially circular rim, a hub, spokes connected with the hub and extending radially towards and out of line with the T-rim, means to secure the ends of the spokes to the rim, and side plates out of line with the T-rim and provided with a flexible flange to compensate for any irregularity in the curvature of the T-rim, the flange of the side plates co-operating with the flange of the T-rim to form a groove for the reception of removable lagging.

ETHAN N. HESCOCK.